(12) United States Patent
Bulawa et al.

(10) Patent No.: US 8,510,188 B2
(45) Date of Patent: Aug. 13, 2013

(54) RECEIVER DRIVEN MONEY TRANSFER ALERT SYSTEM

(75) Inventors: Kurt Bulawa, Parker, CO (US); Michael Michelsen, Arvada, CO (US); Michele Demark, Highlands Ranch, CO (US); David A. Owen, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 12/845,048

(22) Filed: Jul. 28, 2010

(65) Prior Publication Data
US 2012/0030098 A1 Feb. 2, 2012

(51) Int. Cl.
*G06Q 40/00* (2012.01)

(52) U.S. Cl.
USPC ............... 705/35; 705/36 R; 705/37; 705/38; 705/39; 705/40; 705/41

(58) Field of Classification Search
USPC ...................................... 705/35–41
See application file for complete search history.

(56) References Cited

U.S. PATENT DOCUMENTS

| | | | | | |
|---|---|---|---|---|---|
| 5,649,117 | A | * | 7/1997 | Landry | 705/40 |
| 5,956,700 | A | * | 9/1999 | Landry | 705/40 |
| 6,996,542 | B1 | * | 2/2006 | Landry | 705/40 |
| 7,395,241 | B1 | * | 7/2008 | Cook et al. | 705/39 |
| 7,654,449 | B2 | * | 2/2010 | Stoutenburg et al. | 235/379 |
| 7,798,397 | B2 | * | 9/2010 | Henry et al. | 235/379 |
| 8,407,121 | B2 | * | 3/2013 | Paintin | 705/35 |
| 2001/0032183 | A1 | * | 10/2001 | Landry | 705/40 |
| 2002/0055852 | A1 | * | 5/2002 | Little et al. | 705/1 |
| 2002/0073027 | A1 | * | 6/2002 | Hui et al. | 705/40 |
| 2002/0077978 | A1 | * | 6/2002 | O'Leary et al. | 705/40 |
| 2003/0018532 | A1 | * | 1/2003 | Dudek et al. | 705/17 |
| 2003/0167237 | A1 | * | 9/2003 | Degen et al. | 705/64 |
| 2003/0171992 | A1 | * | 9/2003 | Blagg et al. | 705/14 |
| 2003/0220835 | A1 | * | 11/2003 | Barnes, Jr. | 705/14 |
| 2004/0243490 | A1 | * | 12/2004 | Murto et al. | 705/30 |
| 2005/0033684 | A1 | * | 2/2005 | Benedyk et al. | 705/39 |
| 2006/0006224 | A1 | * | 1/2006 | Modi | 235/379 |
| 2007/0063017 | A1 | * | 3/2007 | Chen et al. | 235/379 |
| 2007/0124224 | A1 | * | 5/2007 | Ayers et al. | 705/32 |
| 2007/0187484 | A1 | * | 8/2007 | Cooper et al. | 235/379 |
| 2007/0215689 | A1 | * | 9/2007 | Algiene | 235/379 |
| 2007/0293202 | A1 | * | 12/2007 | Moshir et al. | 455/414.2 |
| 2008/0015989 | A1 | * | 1/2008 | Steiger, Jr. | 705/44 |
| 2008/0052363 | A1 | * | 2/2008 | Pousti | 709/206 |
| 2008/0083826 | A1 | * | 4/2008 | Henry et al. | 235/379 |
| 2008/0215487 | A1 | * | 9/2008 | Stoutenburg et al. | 705/43 |
| 2008/0257952 | A1 | * | 10/2008 | Zandonadi | 235/379 |
| 2008/0270300 | A1 | * | 10/2008 | Jones et al. | 705/41 |

(Continued)

*Primary Examiner* — Narayanswamy Subramanian
(74) *Attorney, Agent, or Firm* — Kilpatrick Townsend & Stockton LLP

(57) ABSTRACT

A method for performing a money transfer initiated by a receiver of the money transfer, wherein the method includes receiving a money transfer initiation request from the receiver and the money transfer initiation request includes an amount of funds to be transferred, receiver information, and sender information. The method also includes staging a money transfer transaction after receiving the money transfer initiation request, wherein the money transfer transaction is pending an authorization by the sender to fund the money transfer. The method further includes providing the sender with a notification of the money transfer transaction, receiving the authorization to fund the money transfer transaction, and executing the money transfer to transfer the funds from the sender to the receiver.

15 Claims, 9 Drawing Sheets

(56) References Cited

U.S. PATENT DOCUMENTS

| | | |
|---|---|---|
| 2009/0030846 A1* | 1/2009 | Martinez-Miranda et al. .. 705/72 |
| 2009/0061831 A1* | 3/2009 | Shastry ................ 455/414.1 |
| 2009/0265272 A1* | 10/2009 | Dill et al. .................. 705/41 |
| 2010/0223182 A1* | 9/2010 | Battaglini .................. 705/43 |
| 2011/0225067 A1* | 9/2011 | Dunwoody ................ 705/27.1 |
| 2011/0246328 A1* | 10/2011 | Dunwoody et al. ......... 705/27.1 |
| 2011/0282787 A1* | 11/2011 | Birdseye et al. ............ 705/43 |
| 2012/0239559 A1* | 9/2012 | O'Leary et al. ............. 705/39 |

* cited by examiner

RECEIVER DRIVEN MONEY TRANSFER ALERT SYSTEM

BACKGROUND OF THE INVENTION

Money transfers are a common and convenient way to send and receive funds. Money transfers are commonly done to transfer funds across state and/or country borders and/or to pay for goods and services. Money transfers are normally initiated by a sender of funds where the sender provides information about a receiver (e.g., the receiver's name, account information, address, etc.) to a money transfer provider, such as Western Union corporation. Currently, however, some money transfer transactions fail due to the sender providing incorrect receiver information. For example, the sender may incorrectly spell the receiver's name and/or provide an incorrect bank account number or address for the receiver. These failures can be frustrating for both the sender and the receiver because a pending transaction may be delayed while the sender and/or money transfer provider corrects the error. The receiver may be additionally frustrated because the receiver may depend on the funds to pay one or more bills.

In some situation, the receiver may be hesitant to provide the sender with certain information necessary to perform a money transfer (e.g., bank account information, name, address, etc.). This may be especially true when the receiver is unfamiliar with the sender. For example, the receiver may be an individual that participates in online sales, such as an online auction. The sender may be a purchaser or winning bidder for one of the receiver's online auctions. In such an instance, the receiver may feel uneasy about providing the sender with account information and/or name and address information because the receiver is unfamiliar with the sender beyond the online transaction. Because money transfers are initiated by the sender, a money transfer may not be possible due to the receiver's hesitancy in providing this information.

In addition, because the receiver, in most instances, is the ultimate beneficiary of the money transfer, the receiver may be more willing to bear the burden of initiating a money transfer and ensuring that all the information provided is correct. However, this burden currently remains with the sender. Embodiments of the present invention solve these and other problems currently associated with money transfers.

BRIEF SUMMARY OF THE INVENTION

Various systems, methods, and devices are described for receiver driven money transfers. Such arrangements may allow for a money transfer transaction to be conducted where the receiver bears the burden of initiating and setting up the money transfer transaction. The money transfer transaction may be set up by the receiver so that the sender of funds need merely to provide an authorization to fund the money transfer and to provide the funds for the money transfer in order for the money transfer to be executed.

According to one embodiment, a method for performing a money transfer may occur at a money transfer host system, where the money transfer is initiated by a receiver of the money transfer. The method may include receiving a money transfer initiation request at the money transfer host system (it should be noted that the request is referred to as both a money transfer initiation request and as a money transfer request throughout the specification, but that both requests refer to the same request). The money transfer initiation request may include an amount of funds to be transferred to the receiver. The money transfer initiation request may further include receiver information. The receiver information may optionally identify the receiver (e.g., provide the receiver's actual name or online name) and identify an account to which the funds will be transferred. The money transfer initiation request may additionally include sender information. The sender information may identify a sender (e.g., provide the sender's real name or online name) and identify a communication address associated with the sender. The sender information may also include account information for an account that the receiver requests to receive the funds from, such as a sender's bank account.

The method may also include staging a money transfer transaction after receiving the money transfer initiation request. The staged money transfer transaction may be pending an authorization by the sender to fund the money transfer. Staging a money transfer transaction may include ensuring that the money transfer complies with at least one money transfer regulation. Ensuring that the money transfer transaction complies with at least one money transfer regulation may occur prior to the sender providing authorization to fund the money transfer.

The method may further include providing the sender with a notification of the money transfer transaction via the communication address. The notification may indicate the amount of funds to be transferred and at least some of the receiver information. Additionally, the notification may include a payment facilitator such as a transaction identifier generated by the money transfer host system or a hyperlink in an email. The payment facilitator may enable the sender to provide the authorization to fund the money transfer by merely providing the payment facilitator to the money transfer host system (e.g., sending the transaction identifier to the host system or responding to the hyperlink). The notification may further include the account information for the account that the receiver requests to receive funds from (e.g., the sender's bank account).

The method may additionally include receiving the authorization to fund the money transfer transaction and executing the money transfer to transfer the funds from the sender to the receiver. If the notification to the sender includes account information for the sender's account designated by the receiver, the authorization may include an instruction to provide the funds from an account other than the designated account.

The method may additionally include generating a transaction identifier for the money transfer transaction. The transaction identifier may be provided to either or both the sender and the receiver. Additionally or alternatively, the receiver may provide the transaction identifier to the sender. Receiving the authorization may include receiving the transaction identifier from the sender.

The method may additionally include receiving a funds designation from the receiver. The fund designation may provide instructions for allocating the funds of the money transfer after the funds are received from the sender. The funds for the money transfer may be received from the sender and automatically allocated in accordance with the funds designation.

The method may additionally include a money transfer initiation service where the sender and/or receiver are enrolled in the money transfer initiation service. The money transfer initiation service may provide one or more of the following services: automatic money transfer initiation requests and staging for the receiver; one or more automatic reminders to the sender to provide funds for the money transfer transaction; automatic notification to the sender that the receiver is requesting funds; and pre-approved funding of the money transfer transaction.

The method may additionally include storing the receiver information and the sender information on the magnetic stripe of a presentation instrument. In such an embodiment, the money transfer initiation request may be provided to the money transfer host system upon the receiver presenting the presentation instrument to a magnetic stripe reading device and upon the receiver providing the amount of funds to be transferred.

In some embodiments, the receiver may be a merchant and the sender may be a customer of the merchant. In such embodiments, the money transfer initiation request may comprise a payment notice from the merchant for a good and/or a service rendered. In such embodiments, the method may include receiving the payment notice, extracting the sender information from the payment notice, and staging the money transfer transaction after receiving the payment notice. The method may also include providing the notification to the customer where the notification includes the payment notice. The method may further include receiving the authorization from the customer to provide funds where the funds will be used to pay for a good and/or service rendered. The money transfer may be executed to transfer the funds from the customer to the merchant to pay for the good and/or service rendered.

The method may additionally include involving a second sender in the money transfer. In such an embodiment, the money transfer initiation request may include second sender information, where the second sender information identifies a second sender and identifies a second communication address associated with the second sender. The embodiment may also include a total amount of funds to be received from either the first sender, the second sender, or both. The embodiment may further include providing the first sender and the second sender with the notification via the first communication address and the second communication address, respectively. Similarly, additional senders (e.g., third sender, fourth sender, etc.) may be involved in the money transfer. The additional senders may each have a respective communication address so that the additional senders can each be provided with the notification.

The embodiment may additionally include receiving an authorization to fund at least a portion of the money transfer transaction from either the first sender, the second sender, or both. The method may additionally include receiving the funds from either the first sender, the second sender, or both and executing a money transfer to transfer the funds from the first sender, the second sender, or both to the receiver. The embodiment may additionally include applying the funds towards the total amount of funds and providing the first sender and the second sender with an indication of the applied funds in relation to the total amount of funds requested. Similarly, when additional senders are involved in the money transfer (e.g., third sender, fourth sender, etc.), an authorization to fund at least a portion of the money transfer transaction can be received from any or all of the senders. Likewise, an indication of the total amount of funds received can be provided to any or all the senders.

Another embodiment of the invention may include a system for performing a money transfer that is initiated by the receiver of the money transfer. The system may include a communication interface that is configured to provide communication between the system and the receiver and/or a sender of the funds. The system may also include a memory component that is configured to store one or more instructions. The system may further include a processor that is communicatively coupled with the memory component. The processor may be configured to receive the instructions from the memory component where the instructions direct the processor to enable the system to perform the money transfer operations.

The money transfer operations performed by the system may include receiving from the receiver via the communication interface, a money transfer initiation request. The money transfer initiation request may include an amount of funds to be transferred to the receiver, receiver information, and sender information. The receiver information may identify the receiver and/or identify an account to which the funds will be transferred. The sender information may identify a sender and/or identify a communication address associated with the sender.

The money transfer operations may also include staging a money transfer transaction after receiving the money transfer initiation request where the money transfer transaction is pending an acceptance by the sender to fund the money transfer. The money transfer operations may further include providing the sender with a notification of the money transfer transaction via the communication address. The notification may indicate the amount of funds to be transferred and/or at least a portion of the receiver information.

The money transfer operations may further include receiving from the sender via the communication interface, the authorization to fund the money transfer transaction. The money transfer operations may additionally include executing the money transfer to transfer the funds from the sender to the receiver.

Another embodiment of the invention may include a method for performing a money transfer that is initiated by a receiver on a wireless device. The method may include providing a transfer application to the wireless device from a host computer system. The transfer application may be configured to communicate with a contact list associated with the wireless device, identify a sender of the funds from the contact list, and obtain sender information associated with the sender from the contact list.

The method may also include receiving a money transfer request at the host system, where the money transfer request is generated by the wireless device. The money transfer request may include an amount of funds to transfer to the receiver, receiver information, and/or sender information. The receiver information may identify the receiver and/or identify an account to which the funds will be transferred. The sender information may identify the sender and/or identify a communication address associated with the sender.

The method may further include staging a money transfer transaction after receiving the money transfer request, where the money transfer transaction is pending an authorization by the sender to fund the money transfer. The method may additionally include providing the sender with a notification of the money transfer transaction via the communication address. The notification may indicate the amount of funds to be transferred and/or at least a portion of the receiver information. The method may additionally include receiving the authorization to fund the money transfer transaction and executing the money transfer to transfer the funds from the sender to the receiver.

The method may further include a wireless device associated with the sender, where the sender's wireless device is also configured to include the transfer application. The notification to the sender may be provided to the sender's wireless device and/or to the transfer application on the sender's wireless device. Additionally, the authorization to fund the money transfer may be received from the sender's wireless device and/or received from the transfer application on the sender's wireless device. The transfer application may also be configured to obtain sender information from a source other than the contact list associated with the receiver's wireless device.

DETAILED DESCRIPTION OF THE INVENTION

Figure 1:
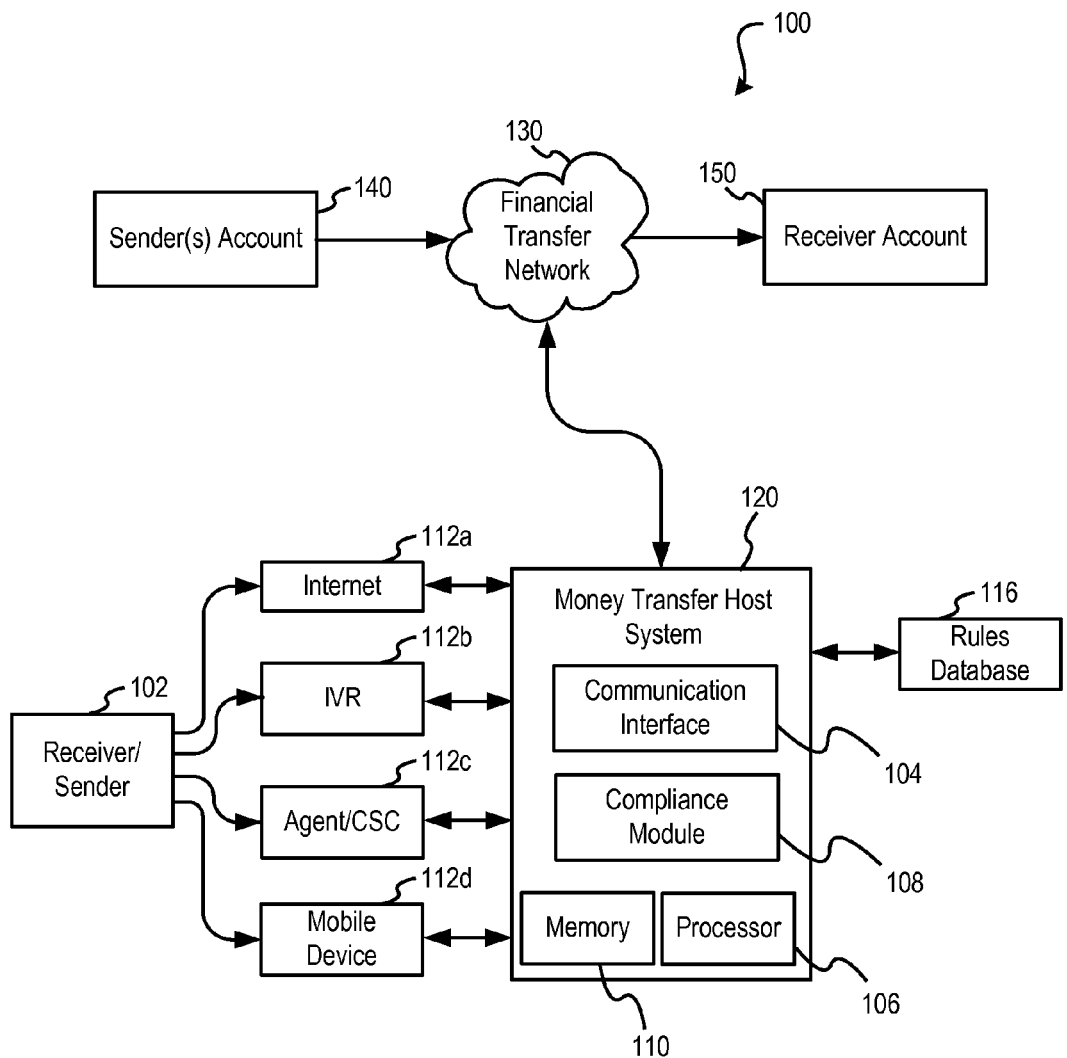
FIG. 1 is a block diagram illustrating a money transfer system for performing receiver initiated money transfers according to embodiments of the present invention.

Various systems, methods, and devices are described for receiver driven money transfers. Such arrangements may allow for a money transfer transaction to be conducted where the receiver bears the burden of initiating or generating the money transfer transaction. The money transfer transaction may be generated so that the sender of funds need merely to provide an authorization to fund the money transfer and to provide the funds for the money transfer in order for the money transfer to be executed.

Currently, a sender of funds in a money transfer transaction is often required to initiate and/or set up the money transfer transaction in order to transfer funds to a receiver. To initiate and/or set up the money transfer transaction, the sender is responsible for providing accurate information about the receiver and/or about the sender. The information may include the receiver's name, address, account information (i.e., to where the funds are to be transferred), phone number, M-wallet information, etc. The information may also include the sender's name, address, account information (i.e., from where the funds are to be transferred), phone number, M-wallet information, etc. The sender may need to communicate with the receiver in order to obtain the receiver's information for the money transfer transaction. On occasion a money transfer transaction may fail due to the sender providing incomplete or inaccurate information about the receiver and/or about the sender. The information may be incomplete or inaccurate due to the sender's mistake (e.g., substituting or switching a number in an account, providing an incorrect spelling of a name, etc.) or may be the result of miscommunication between the receiver and the sender (e.g., the sender misses a number in an account or misunderstands the spelling of the receiver's name or bank during the communication, etc.).

In some instances, the receiver may be hesitant or may feel uneasy about sharing personal information with the sender. For example, in some money transfer transactions, the sender and receiver may not know each other beyond the money transfer transaction (e.g., an online seller and buyer, etc.). Due to this relationship, the receiver may not feel comfortable sharing account information and/or other personal information with the sender (e.g., the sender may only know the receiver's online name and not the receiver's actual name). Because the sender is required to provide the receiver's information to initiate the money transfer transaction, the receiver's hesitancy does not allow for a money transfer transaction to occur.

In addition, since the receiver of the money transfer may be the ultimate beneficiary of the money transfer, the receiver may be more motivated and/or willing to initiate the money transfer and/or to ensure that all the information provided is accurate. Further, current problems associated with money transfer transactions may be alleviated by enabling the receiver to initiate and set up the money transfer transaction. For example, the receiver may frequently request that a sender provide funds to one or more different accounts and/or locations; or the receiver may frequently change accounts (e.g., change bank accounts, close old accounts, change from savings to checking accounts, etc.). Such sporadic behavior places a large burden on the sender to ensure that a money transfer is properly initiated because the sender must continually provide new and/or different account information to the money transfer host system when initiating a money transfer transaction. This behavior may cause one or more money transfers to fail because the sender may be prone to making a mistake due to the frequent changes. In addition, mistakes may be made because the sender is busy and/or less concerned with ensuring that the money transfer will occur. The present invention solves these and other problems as is realized below with reference to the figures and embodiments of the invention.

FIG. 1 illustrates a block diagram of a money transfer system 100 for performing receiver initiated money transfers. The system 100 may include a money transfer host system 120, which may be operated or used by a money transfer service provider such as a bank, kiosk, money transfer service (e.g., Western Union corporation), point of sale device at a grocery or convenience store, etc. The money transfer host system 120 may include one or more components, which may be hardware and/or software components, such as a communication interface 104, a compliance module 108, a memory component, and/or a processor 106. The money transfer host provider 120 may also be configured to include or be operational with a rules database 116. The transaction or method steps for performing the money transfer may occur at the money transfer host system 120.

The money transfer transaction may include staging a money transfer transaction at the money transfer host system 120 after receiving a money transfer initiation request from the receiver 102. The money transfer transaction may be pending an acceptance by a sender 102 to fund the money transfer (it should be noted that the request is referred to as both a money transfer initiation request and as a money transfer request throughout the specification, but that both requests refer to the same request). Staging the money transfer transaction may include receiving all the information necessary for the money transfer transaction at the money transfer host system 120 prior to notifying the sender 102 of the money transfer transaction. Because all the necessary information is received at the money transfer host system 120, the money transfer may be executed upon the sender providing an authorization to fund the money transfer and/or upon the sender providing funds for the money transfer. In this manner the receiver bears the burden of initiating and setting up the money transfer, which burden is currently carried by the sender.

Communication interface 104 may be configured to provide communication between the system and the receiver and/or the sender 102. FIG. 1 depicts element 102 as both the sender and receiver to show that the money transfer host system 120 may communicate with both the sender and the receiver 102 and to show that the sender and receiver 102 may both use any of a plurality of communication devices 112 to communicate with the money transfer host system 120. The communication interface 104 may provide a communication link between the money transfer host system 120 and the plurality of communication devices 112 so that information may be exchanged between the money transfer host system 120 and the sender and/or receiver 102. The communication interface 104 may further provide communication between the money transfer host system 120 and one or more rules databases 116 to obtain and/or provide rules for the money transfer transaction, such as obtaining any rules provided by the sender and/or receiver 102 or any rules or regulations established by law.

Memory component 110 may be configured to store one or more instructions that may be executed by the processor 106 in order to perform the money transfer transaction. Memory component 110 may be either long term memory (e.g., ROM, etc.), short term memory (e.g., RAM, etc.), or a combination of both. The memory component 110 may permanently store the one or more instructions or obtain the one or more instructions from one or more databases (not shown) that are contained within or remote to the money transfer host system 120.

Processor 106 may be communicatively coupled with the memory component 110 so that the processor 106 may receive the one or more instructions from the memory component 110. The processor 106 may execute the one or more instructions and the instructions may direct the processor 106 to enable the money transfer host system 120 to perform the money transfer operations. For example, the instructions may direct the processor 106 to enable the communication interface 104 to obtain and provide information to the plurality of communication devices 112 so that the receiver and/or sender 102 may communicate with the money transfer host system 120 and initiate the money transfer transaction. Through the communication interface 104, the processor 106 may request and receiver one or more pieces of information from the receiver and/or sender 102 and/or receive one or more instructions from the sender and/or receiver 102. The processor 106 may further enable the money transfer host system 120 to communicate and operate with a financial transfer network 130 and/or the rules database 116 to perform the money transfer operations.

Compliance module 108 may be used to ensure that the money transfer complies with one or more rules or regulations, such as government regulations. For example, the money transfer service provider operating money transfer system 100 may be required to comply with various government regulations (possibly varying by country) intended to prevent fraudulent and/or illegal use of money transfer systems. An example of a compliance measure that the money transfer service provider may use is a list of persons that the money transfer service provider is prohibited from doing business with published by the Office of Foreign Asset Control (OFAC). The money transfer service provider may be required by law to not do business with (e.g., as a payor or payee) persons published on such a list. Other compliance measures may include gathering additional information about payors and payees conducting a money transfer that exceeds a particular amount and/or is international. Money transfer transactions being conducted with cash may also include additional compliance measures. Therefore, depending on the location of the payor and payee, the amount of the money transfer, and the payment method, each money transfer may be subjected to varying levels of examination and regulation by compliance module 116.

The money transfer operations performed by the money transfer system 100 may include receiving from the receiver 102 via the communication interface 104, a money transfer initiation request. The money transfer initiation request may include, among other things, an amount of funds to be transferred to the receiver, receiver information, and/or sender information. The receiver information may identify the receiver and/or identify one or more accounts to which the funds will be transferred (e.g., bank account, cash pickup from an agent of the money transfer service, loading a prepaid card, M-wallet, etc.). The sender information may identify a sender, identify a communication address associated with the sender, and/or identify one or more accounts from which the receiver is requesting that the funds be provided.

The communication devices 112 may be configured to enable the receiver and/or sender 102 to communicate with the money transfer host system 120 and thereby provide and receiver instructions to and from the money transfer host system 120. The communication devices may include the Internet 112*a*, an interactive voice response (IVR) program 112*b*, an agent of the money transfer service at a physical location/online or customer service call center (CSC) 112*c*, and/or a mobile device 112*d*. For example, via a wireless device 112*d* (e.g., the receiver's cell phone) or an IVR 112*b* program, the money transfer host system 120 may receive the money transfer initiation request from the receiver 102. Similarly, the money transfer host system 120 may provide the sender 102 with a notification of an initiated money transfer transaction via the Internet 112*a* (e.g., an email notification) or through the wireless device 112*d* (e.g., SMS message to the sender's cell phone). The notification may indicate the amount of funds to be transferred and/or may indicate a portion of the receiver information. Likewise, the sender 102 can provide the money transfer host system 120, via an agent 112*c* of the money transfer service, with an authorization that indicates the sender's willingness to fund the money transfer transaction.

The money transfer host system 120 may execute or otherwise perform a transfer of funds from the sender to the receiver by operating with or otherwise utilizing a financial transfer network 130. Through the financial transfer network 130 the funds may be transferred from the control of the sender to the control of the receiver, for example by transferring the funds from one or more senders' accounts 140 to the receiver's account 150. The sender or sender's accounts 140 and the receiver's account or accounts 150 may be any of a variety of accounts. For example, the accounts may be checking account, savings account, credit card account, prepaid card account, a M-wallet account on a mobile device, an account with the money transfer service so that the cash may be provided to or received from an agent of the money transfer service, or any other type of account. A variety of different types of transfers may be performed using the different accounts. For example, the sender may transfer funds from an M-wallet account to a receiver's money transfer service account so that the receiver can pick up the cash from any of a plurality of physical locations of the money transfer service or the sender can send the money from a credit card or prepaid card account to a sender's M-wallet, bank account, or prepaid card (e.g., the funds are loaded onto the prepaid card), etc.

Figure 2:
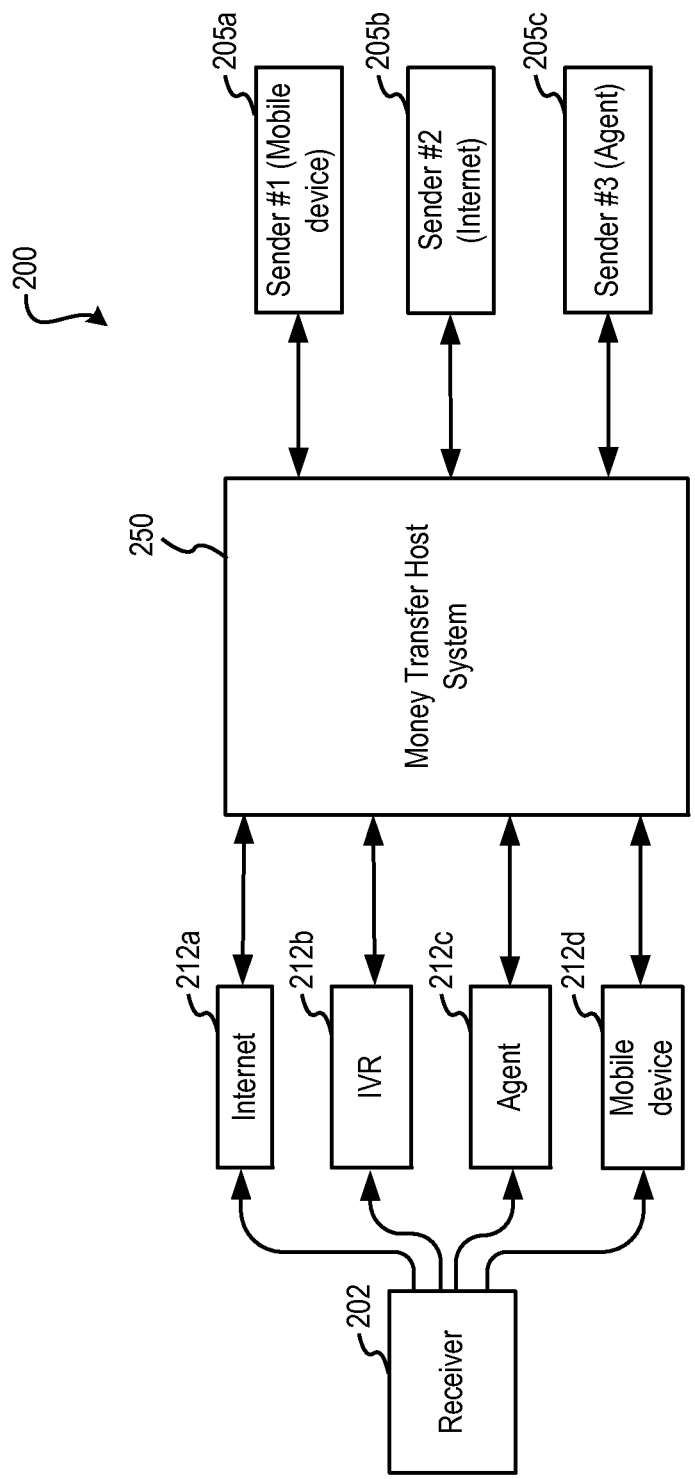
FIG. 2 is another block diagram illustrating a money transfer system for performing receiver initiated money transfers according to embodiments of the present invention.

FIG. 2 illustrates another block diagram of a money transfer system 200 for performing receiver initiated money transfers. The money transfer system 200 may include one or more similar components to system 100 such as the money transfer host system 250, a plurality of communication devices 212 that the receiver 202 and/or sender(s) 205*a* may use to communicate with the money transfer host system 250, a communication interface (not shown), processor (not shown), etc. FIG. 2 specifically shows the receiver 202 communicating with the money transfer host system 250 to initiate one or more money transfer transactions that request that a plurality of senders 205*a-c* provide funds for the one or more money transfer transactions. The plurality of senders 205*a-c* may likewise communicate with the money transfer host system 120 via a variety of communication device (blocks 205*a-c* show communication through a mobile device 205*a*, the Internet 205*b*, and an agent 205*c*) to either accept (authorize) to provide funds or deny to provide funds. The money transfer initiation request may be a request for the plurality of senders 205*a-c* to fund a single money transfer transaction or may be a request that the plurality of senders 205*a-c* fund a plurality of money transfer transactions (e.g., a request that sender 205*a* fund a first money transfer transaction while senders 205*b-c* fund a second money transfer transaction).

For example, the receiver 202 may request that senders 205*a-c* provide $1500 in a money transfer. Each sender 205*a-c* may provide an authorization to the money transfer host system 120 to fund all or a portion of the money transfer request. As the money transfer host system 250 receives the funds from the senders 205*a-c*, the money transfer host system 250 may pool or otherwise accumulate the funds into a single account and provide a notice to the receiver 202 and/or senders 205*a-c* about the total amount of funds provided as well as a notice about the total amount of funds requested. In this way the senders 205*a-c* may be informed about the amount of funds needed to meet the receiver request. Alternatively, the funds may be provided to the receiver as soon as they are received, but the money transfer host system 250 may keep a tally of the total amount received, which may be provided to the receiver 202 and/or senders 250*a-c*. The receiver may further request that the senders 205*a-c* provide the funds from a specific account (e.g., sender 205*a* provides funds from a visa account, sender 205*b* provides funds from a checking account, and sender 205*c* provides cash to an agent of the money transfer service).

Figure 3:
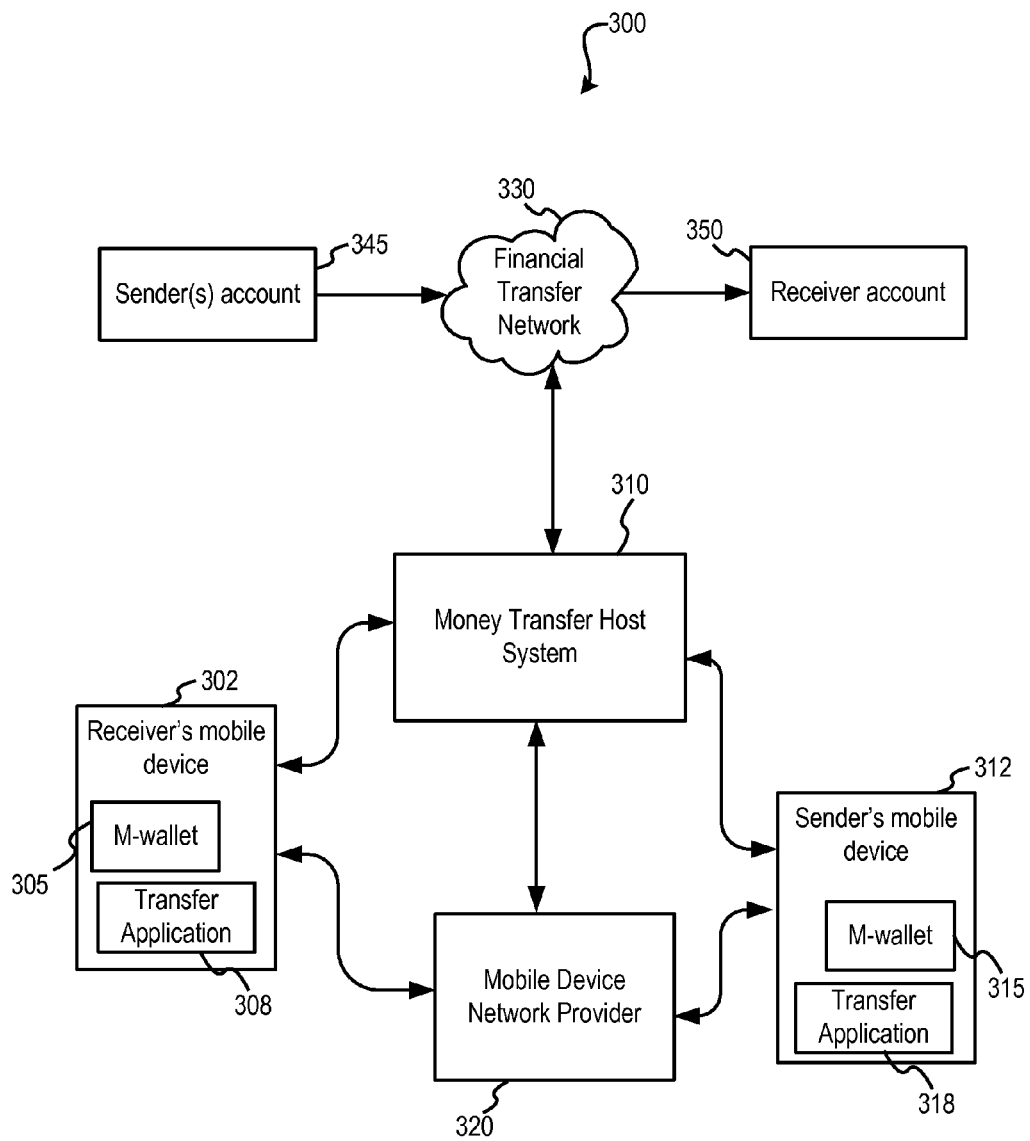
FIG. 3 is a block diagram illustrating a money transfer system for performing receiver initiated money transfers using a mobile device according to embodiments of the present invention.

FIG. 3 illustrates a block diagram a money transfer system 300 for performing receiver initiated money transfers using a mobile device. The system 300 may include a money transfer host system 310 that is configured to communicate with a receiver's mobile device 302 and/or a sender's mobile device 312. Communication may be facilitated through a communication interface (not shown) as previously described. The money transfer host system 310 may further be configured to communicate or otherwise operate with a mobile device network provider 320 and a financial transfer network 330 to transfer funds from a sender's account 345 and/or a sender's M-wallet account 315 to a receiver's account 350 and/or a receiver's M-wallet account 305. The sender and/or receiver's mobile devices, 312 & 302 respectively, may include a transfer application, 318 & 308 respectively, that facilitates in performing the money transfer transaction. The transfer applications 308 & 312 may be configured to access a contact list on the mobile device and obtain information from the contact list that may be used to initiate a money transfer request. Further, the transfer application 308 & 312 may be configured to provide and receive messages (e.g., SMS, MMS, etc.) to the mobile device network operator 320, the money transfer host system 310, or both to perform the money transfer transaction.

For example, to initiate a money transfer request, the receiver may access the transfer application 308 on the receiver's mobile device 302 and select one or more senders to receive funds from. The transfer application may provide indicia on the mobile device (e.g., a selection button displayed on the screen) for each individual in the mobile device's contact list so that the receiver can quickly select a sender by selecting the indicia (e.g., pressing one of the displayed buttons). In addition, the transfer application can include indicia for other entities (e.g., businesses) that the receiver desires to include as potential senders. Using the information from the contact list and/or the information that the receiver provides, the transfer application may generate a money transfer initiation request that may be provided to either the mobile device network provider 320, the money transfer host system 310, or both to initiate the money transfer. The money transfer initiation request may be in the form of an SMS or MMS message or any other form of electronic communication. The money transfer host system 310 and/or the mobile device network provider 320 can route the request and/or a notification to the sender's mobile device 312 to notify the sender of the request. After receiving the request and/or notification, the sender can accept or deny to provide the funds and send an authorization response to the money transfer host system 310 and/or the mobile device network provider 320 via the transfer application 318.

The request may indicate the amount of funds to provide and may also indicate an account to provide the funds from (e.g., the sender's M-wallet 315). The money transfer host system 310 may communicate or otherwise operate with the financial transfer network 330 and/or the mobile device network operator 320 to transfer the funds from the sender to the receiver (e.g., from the sender's M-wallet account 315 to the receiver's M-wallet account 305, from the sender's M-wallet account 315 or sender account 345 to the receiver's account 350, etc.)

Figure 4:
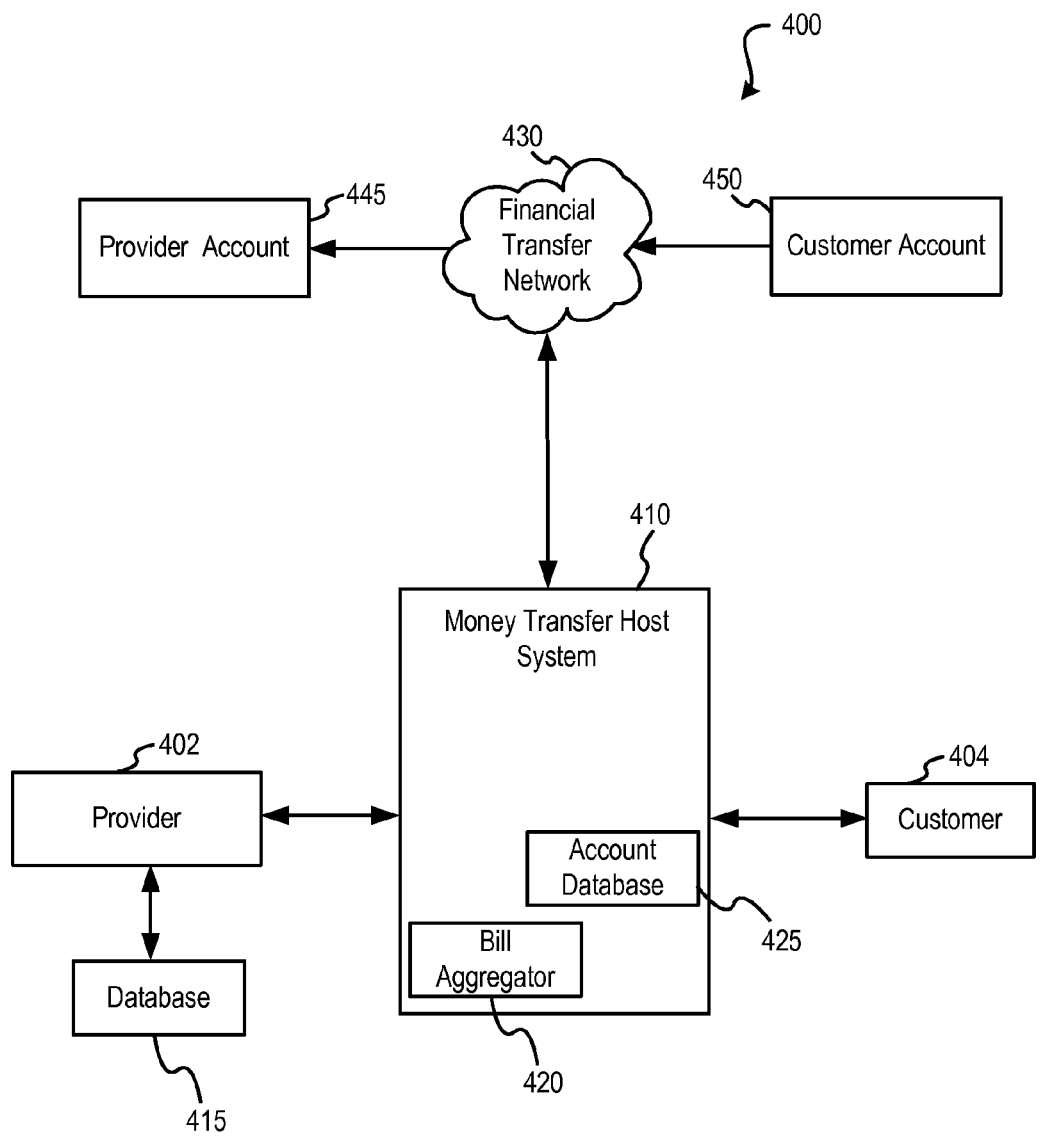
FIG. 4 is a block diagram illustrating a money transfer system for performing receiver initiated money transfers according to embodiments of the present invention wherein the receiver is a merchant and the sender is a customer of the merchant.

FIG. 4 illustrates a block diagram of a money transfer system 400 for performing receiver initiated money transfers that involve one or more providers 402 and a customer 404 of the provider(s). In FIG. 4, the provider 402 is similar to the receiver described in FIGS. 1-3, while the customer 404 is similar to the sender described in those Figs. The system 400 may include a money transfer host system 410 that is similar to the host systems of FIGS. 1-3. The money transfer host system 410 may be configured to communicate or otherwise operate with a financial transfer network 430 to transfer funds from the customer's account 450 to the provider's account 445 to pay for a good and/or service rendered by the provider. The provider 402 may be any type of merchant that sells a variety of goods (e.g., online merchant, department store, etc.) and/or may be any type of service provider that provides a variety of services (e.g., utility company, dentist, etc.).

The provider 402 may provide a payment notice (e.g., a bill) to the money transfer host system 410 that the customer 404 is responsible for. The money transfer host system 410 may generate a money transfer initiation request from the payment notice and may provide a notification to the customer 404 of the money transfer request. Alternatively, the provider 402 may generate the money transfer initiation request and provide the request to the money transfer host system 410. To generate the money transfer initiation request, the money transfer host system 410 may extract information from the payment notice for the customer and/or for the provider (e.g., extract the customer's name, address, account number with the provider, extract the provider's address, account information, etc.). Additionally and/or alternatively, the money transfer host system 410 may communicate with a database 415 associated with the provider 402 to obtain information about the customer 404 and/or the provider 402 (e.g., obtain the customer's name, address, account information, amount due, provider's information, etc.).

The money transfer host system 410 may also communication with an account database 425 maintained by the money transfer host system 410 to obtain information about the customer 404 and/or provider 402. For example, the customer 404 may have an account with the money transfer service provider that operates the money transfer host system (e.g., a bank account, M-wallet account, etc.). The money transfer host system 410 can communicate with database 425 to obtain information associated with this account (e.g., account number, customer's address, etc.). The money transfer host system 410 may send a notification to the customer 404 about the payment notice and receive an authorization from the customer 404 that indicates that the customer will provide funds for the money transfer to pay for the goods and/or services rendered by the provider 402.

The money transfer host system 410 may also have a bill aggregator 420 that aggregates multiple payment notices from one or more providers 402. The money transfer host system 410 may send the aggregated bill and/or a notification of the aggregated bill to the customer 404 and receive one or more authorizations from the customer 404 that indicate the customer's willingness to fund one or more money transfers. In one embodiment, the customer 404 may provide a single authorization and may provide sufficient funds in a single money transfer to cover all the aggregated payment notices. The money transfer host system 410 could divide the funds between the payment notices to pay the one or more providers 402 for the goods and/or service rendered.

Figure 5:
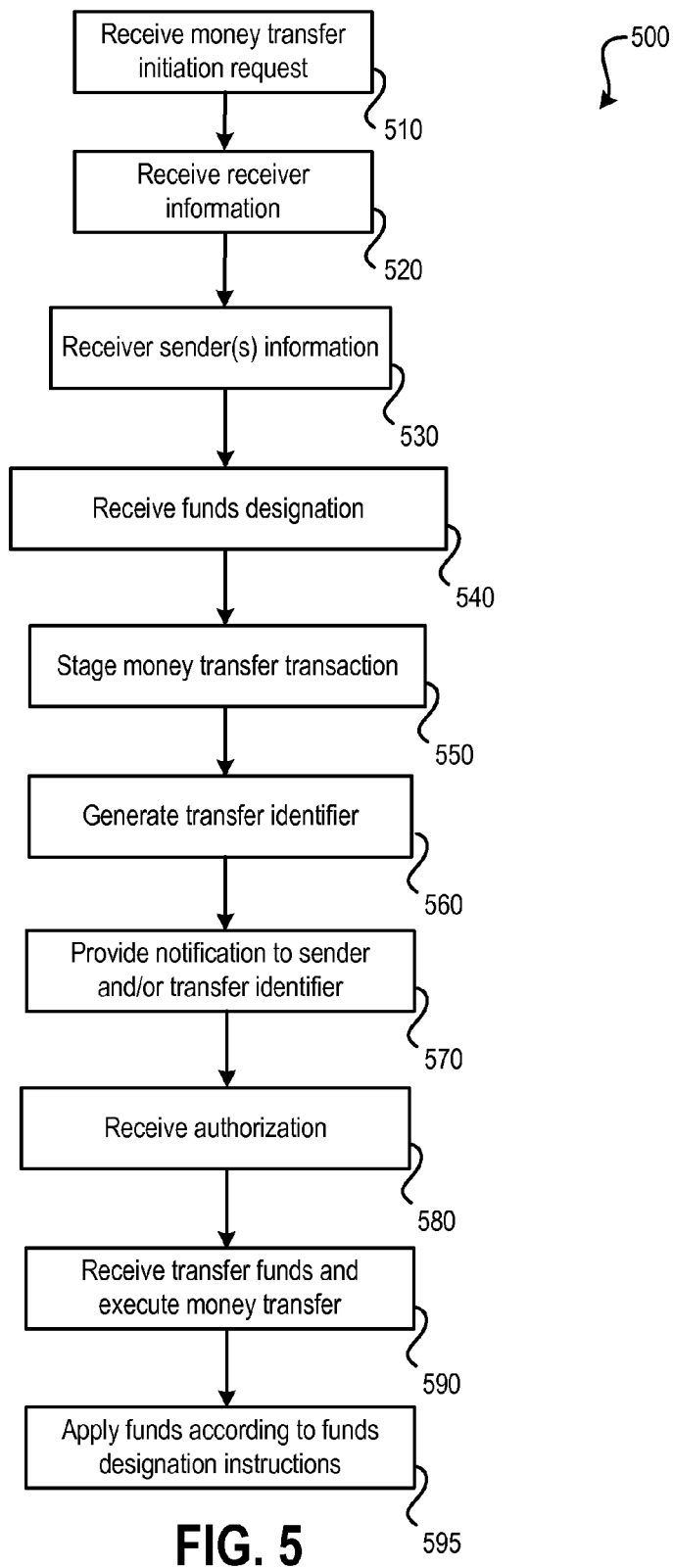
FIG. 5 illustrates a process for performing a receiver initiated money transfer according to embodiments of the present invention.

FIG. 5 illustrates a process 500 for performing a receiver initiated money transfer. The process 500 may begin at block 510 with a money transfer host system (e.g., money transfer host system 120) receiving a money transfer initiation request from a receiver via a communication device as previously discussed. The money transfer initiation request may include an amount of funds to transfer to the receiver, and may further include receiver information and/or sender information. In addition, the money transfer initiation request may include a schedule that provides a date when the money transfer request is to be initiated. For example, the receiver may provide the money transfer host system with all information necessary to perform a money transfer transaction (e.g., sender's name, address, account information, etc.). The receiver may then schedule to have the money transfer request initiated a month from when the information was provided or, alternatively, may schedule to have a money transfer request initiated every month on the same day (e.g., every first Tuesday of the month, every $3^{rd}$, etc.). Scheduling the money transfer initiation request may be advantageous where the receiver will make repeated money transfer request such as when the receiver is the spouse of a migrant worker and the receiver relies on the spouses' monthly money transfers to pay one or more bills.

At blocks 520, the money transfer host system receives the receiver information. The receiver information may optionally identify the receiver. The identification may be the receiver's name or may be a representation of the receiver such as a portion of the receiver's name or an online identification of the receiver (e.g., a receiver's online name that the sender is familiar with). In this manner the receiver may protect sensitive information from the sender. The receiver information may also include an account to which the funds will be transferred (e.g., M-wallet account information, money transfer service account, etc.).

At block 530, the money transfer host system receives the sender information. The sender information may identify the sender and/or identify a communication address (e.g., email address, phone number, mailing address, etc.) associated with the sender. The identification of the sender may be the sender's name or may be an representation of the sender (e.g., a sender's online name) that the money transfer host system is familiar with. Additionally, if the sender has an account with the money transfer host system, the host system may obtain the sender's communication address by communicating with a database. Further, the sender information may include an identification of an account that the receiver desires to receive the funds from and/or may identify a plurality of senders to receive funds from.

The sender and/or receiver may be enrolled in a money transfer initiation service. Enrollment in the money transfer initiation service may provide the sender and/or receiver with one or more of the following services: automatic money transfer initiation requests upon receiving a fund amount and an identification of a sender; automatic staging of the money transfer transaction upon receiving the amount and sender identification; one or more automatic reminders to the sender to provide funds for a staged money transfer transaction; automatic notification to the sender upon initiating a money transfer initiation request; and/or pre-approved/automatic funding of the money transfer transaction based on the selected sender.

In addition, the receiver and/or sender information may be stored on the magnetic stripe of a presentation instrument so that a money transfer request is automatically initiated and provided to the money transfer host system upon the receiver presenting the presentation instrument to a magnetic stripe reading device and upon the receiver providing the amount of funds to be transferred.

At block 540, the money transfer host system may receive a funds designation from the receiver. The funds designation may provide instructions for allocating the funds of the money transfer. In other words, the receiver may pre-designate how the transferred funds are distributed so that the transfer and application of the funds occur automatically without any further input from the receiver. The receiver may also divide the allocation of the funds so that a portion of the funds is allocated toward one payment while another portion is allocated toward a different payment. For example, the receiver may allocate $50 of the funds to be used to pay for a utility bill while $150 of the funds is provided to the receiver as cash. Similarly, a transfer application on the receiver's mobile device, such as the transfer application described in FIG. 3, may include indicia (e.g., a button displayed on the mobile device's screen) that associates a specific purchase with a specific sender. For example, the indicia may associate a utility bill with the receiver's spouse so that when the utility bill indicia is selected a money transfer request is initiated and sent to the receiver's spouse for payment and so that the transferred funds are applied to the utility bill upon receipt. Similarly, one or more online applications and/or websites (e.g., an online auction site, a payment site for an online auction, etc.) may contain indicia that associates one or more payments with one or more senders and that automatically generates a money transfer request upon selecting the indicia.

The funds designation or allocation information may also be stored on the magnetic stripe of presentation instrument (e.g., a card) so that when the receiver uses the presentation instrument for select purchases, a money transfer request is initiated for the purchases and sent to the sender. For example, the presentation instrument may not have any funds associated with the presentation instrument, but rather the funds designation may be stored on the magnetic stripe of the presentation instrument so that when the receiver purchases groceries with the presentation instrument, the funds designation directs a money transfer request to be initiated and sent to a pre-designated sender. The funds designation would further direct that any received funds be applied to pay for the groceries. Where the sender is enrolled in a money transfer initiation service, the authorization to fund the money transfer transaction may be automatic so that a provider of goods (e.g., the grocery store) may instantly receive the funds of the money transfer. Unlike pre-loading or pre-funding a prepaid card, a presentation instrument with the funds designation stored on the magnetic stripe would allow the sender to control the types of purchases that the sender funds because the sender could deny the money transfer transaction associated with a purchase.

Further, the funds designation could associate one sender with one type of payment (e.g., one bill), one sender with multiple types of payments (e.g., multiple bills), multiple senders with one type of payment, and/or multiple senders with multiple types of payments. In this manner a variety of money transfer transactions and funds allocations are possible using the funds designation.

At block 550, the money transfer host system may stage a money transfer transaction after receiving the money transfer initiation request. Staging a money transfer transaction may involve receiving all the necessary transfer information (e.g., receiver's name, address, account information, sender's name, address, account information, etc.) setting up the transaction so that the transfer can be executed or completed upon the sender providing an authorization to fund the money transfer and/or providing funds for the money transfer. In essence, the money transfer transaction is pending only an authorization by the sender to fund the money transfer. Staging a money transfer transaction may further include ensuring that the money transfer complies with at least one or all money transfer regulations (i.e., pre-clearing the money transfer), such as the OFAC regulations described previously. If the money transfer is pre-cleared before an authorization is received from the sender, the money transfer may be executed immediately upon receiving the authorization. Since the money transfer transaction is staged prior to the sender receiving the notification, the recipient bears nearly the entire burden for initiating the money transfer transaction and for ensuring that the money transfer information is correct and that the money transfer complies with all applicable rules and regulations.

At block 560, a transaction identifier may be generated by the money transfer host system, such as a money transfer control number (MTCN). The transaction identifier can be associated with the staged money transfer transaction so that all information associated with the stage money transfer transaction can be recalled by providing the transaction identifier. The transaction identifier may be provided to the sender, receiver, or both. Additionally or alternatively, the receiver may receiver the transaction identifier from the money transfer host system and provide the transaction identifier to the sender. At block 570, the money transfer host system may provide the sender with a notification of the money transfer transaction via the communication address provided in the sender information. The notification may indicate the amount of funds to be transferred and at least some of the receiver information. For example, the notification may indicate the receiver's full name or may indicate a representation of the receiver (e.g., an online name) so that the receiver's identity remains hidden from the sender. Similarly, the notification may or may not include the receiver's account information so that the account information remains hidden from the sender. Because the receiver can control what information is provided to the sender and the amount of information or content, the receiver may be more willing to engage in a money transfer transaction and/or provide information for a money transfer transaction.

Additionally, the notification may include a payment facilitator such as the transaction identifier generated by the money transfer host system or a hyperlink in an email. The payment facilitator may enable the sender to provide the authorization to fund the money transfer by merely providing the payment facilitator to the money transfer host system (e.g., by clicking on the hyperlink in an email or by providing the transaction identifier). The notification may further include the account information for an account that the receiver requests to receive funds from (e.g., the sender's bank account, credit card account, etc.). The notification may additionally be a recurring notification such as a notification every month over a specified period to provide an amount of funds (e.g., every month for 6 months to provide $100 each month or to provide a variable amount each month)

At block 580, the money transfer host system receives the authorization from the sender to fund the money transfer transaction. Receiving the authorization may include receiving the transaction identifier only so that the money transfer is authorized and funded upon receipt of the transaction identifier. Alternatively, receiving the authorization may include receiving funds from the sender for the money transfer transaction or may include receiving the transaction identifier and receiving funds. Receiving the authorization may further include some other type of acknowledgement to fund the money transfer transaction such as a response to an email hyperlink, a SMS message, other electronic message, authorization via telephone communication or to an agent of the money transfer service provider, written authorization, etc. If the notification to the sender includes account information for an account that the receiver requests to receive funds from (e.g., a sender's bank account), the authorization may include an instruction to provide the funds from an account other than the account specified by the receiver. The sender may further modify the money transfer request in other ways (e.g., modify the amount of funds, the frequency of the request, etc.). The modifications may be temporary or permanent.

At block 590, the money transfer host system may receive the funds and execute the money transfer to transfer the funds from the sender to the receiver. In some embodiments, the sender may have an account with the money transfer host system from which the funds may be drawn or the money transfer host system may automatically draw the funds from an account not associated with the host system so that the sender need not provide funds for each money transfer transaction. At block 595, the money transfer host system may apply the received funds in accordance with any funds designation received at block 540.

The process 500 may additionally include involving a second sender in the money transfer transaction. In such an embodiment, the money transfer initiation request may include second sender information, where the second sender information identifies a second sender and identifies a second communication address associated with the second sender. The embodiment may also include a total amount of funds to be received from either the first sender, the second sender, or both. The embodiment may further include providing the first sender and the second sender with the notification via the first communication address and the second communication address respectively.

The embodiment may additionally include receiving an authorization to fund at least a portion of the money transfer transaction from either the first sender, the second sender, or both. The method may additionally include receiving the funds from either the first sender, the second sender, or both and executing a money transfer to transfer the funds from the first sender, the second sender, or both to the receiver. The embodiment may additionally include applying the funds towards the total amount of funds and providing the first sender and the second sender with an indication of the applied funds in relation to the total amount of funds requested.

Figure 6:
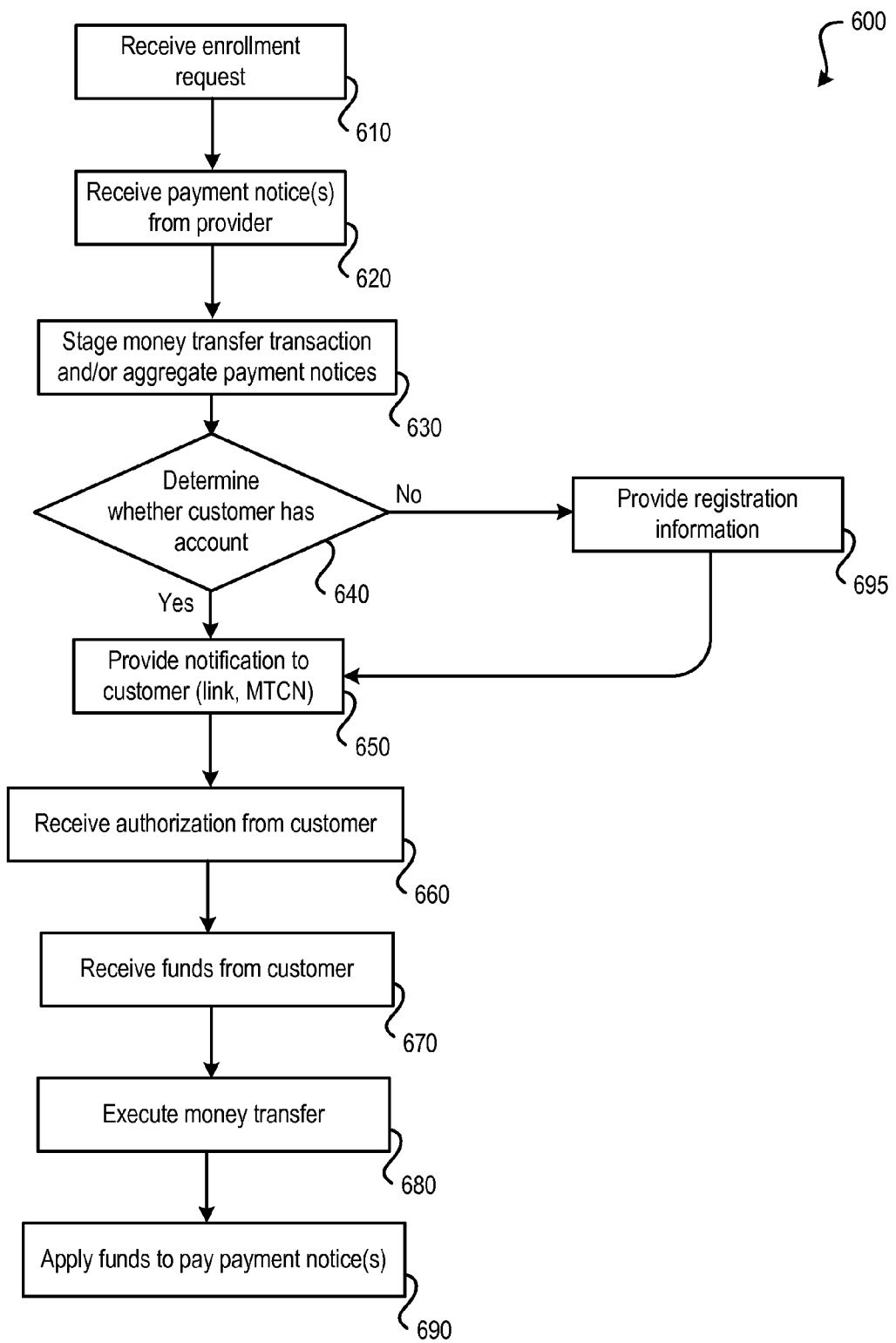
FIG. 6 illustrates another process for performing a receiver initiated money transfer according to embodiments of the present invention.

FIG. 6 illustrates another process 600 for performing a receiver initiated money transfer. Process 600 may involve a money transfer transaction between one or more providers (e.g., merchant/service provider) and a customer as previously described. At block 610, the process 600 may begin with the money transfer host system receiving an enrollment request from the provider, the customer, or both to participate in a money transfer initiation service. The enrollment in the money transfer initiation service may provide the customer and/or provider with the services previously described. At block 620, the money transfer host system may receive one or more payment notices from the provider for one or more goods and/or services rendered. The payment notice may include information about the customer, the amount due, the goods and/or services rendered, etc. The money transfer host system can generate the money transfer request based on the payment notice (e.g., extracting information) and/or by accessing one or more databases as previously described.

At block 630, the money transfer host system may stage the money transfer transaction and/or aggregate multiple payment notices as previously described. The money transfer host system can aggregate all the customer's payment notices (e.g., electronic bills sent via email, physical bills sent via mail, etc.). The money transfer host system may provide the aggregated payment notices to the customer or may send individual payment notices to the customer based on the customer's preference. At block 640, the money transfer host system determines whether the customer has an account with the money transfer host system, such as if the customer is enrolled in the money transfer initiation service and/or another service associated with the money transfer service provider. In some embodiments, the provider may determine whether the customer has an account with the money transfer host system. For example, the provider (online, in a physical location, via mail, etc.) may inquire as to whether the customer has an account with the money transfer service provider (e.g., an account with Western Union corporation) to provide the customer with an additional payment mechanism when purchasing goods and/or services. If the customer has an account, the customer may provide the provider with an account number so that money transfer requests may be automatically initiated and provided to the customer's account.

At block 695, if the customer does not have an account with the money transfer service provider, the money transfer host system may optionally provide the customer with registration information. If the customer registers for an account or the customer has an account, the money transfer host system provides the customer with a notification of the staged money transfer transaction (block 650). In some embodiments an account is not necessary and the process 600 can continue to block 650 regardless of if the customer has an account. Providing the customer with a notification can include providing a link in an email that the customer selects to authorize providing funds for the money transfer transaction, or can include providing a transaction identifier as previously described.

At block 660, the money transfer host system receives the authorization from the customer to fund the money transfer transaction, such as by receiving the transaction identifier or receiving the authorization through a hyperlink. At block 670, the money transfer host system receives the funds from the customer to pay for the goods and/or services rendered. The funds may be automatically received from an account associated with the money transfer service provider, received in cash to an agent of the money transfer service provider, etc. If less than the total amount of funds requested from multiple providers is received from the customer, the money transfer host system may divide the received funds among the providers according to priority (e.g., priority due to court mandated child support, etc) and/or by percentage according to a percentage owed to each provider (e.g., 75% to provider A if 75% of the debt is owed to provider A) and/or according to some combination thereof.

At block 680, the money transfer host system executes the money transfer to transfer the funds from the customer to the provider and, at block 690, the money transfer host system applies the funds to pay for the goods and/or services rendered.

Figure 7:
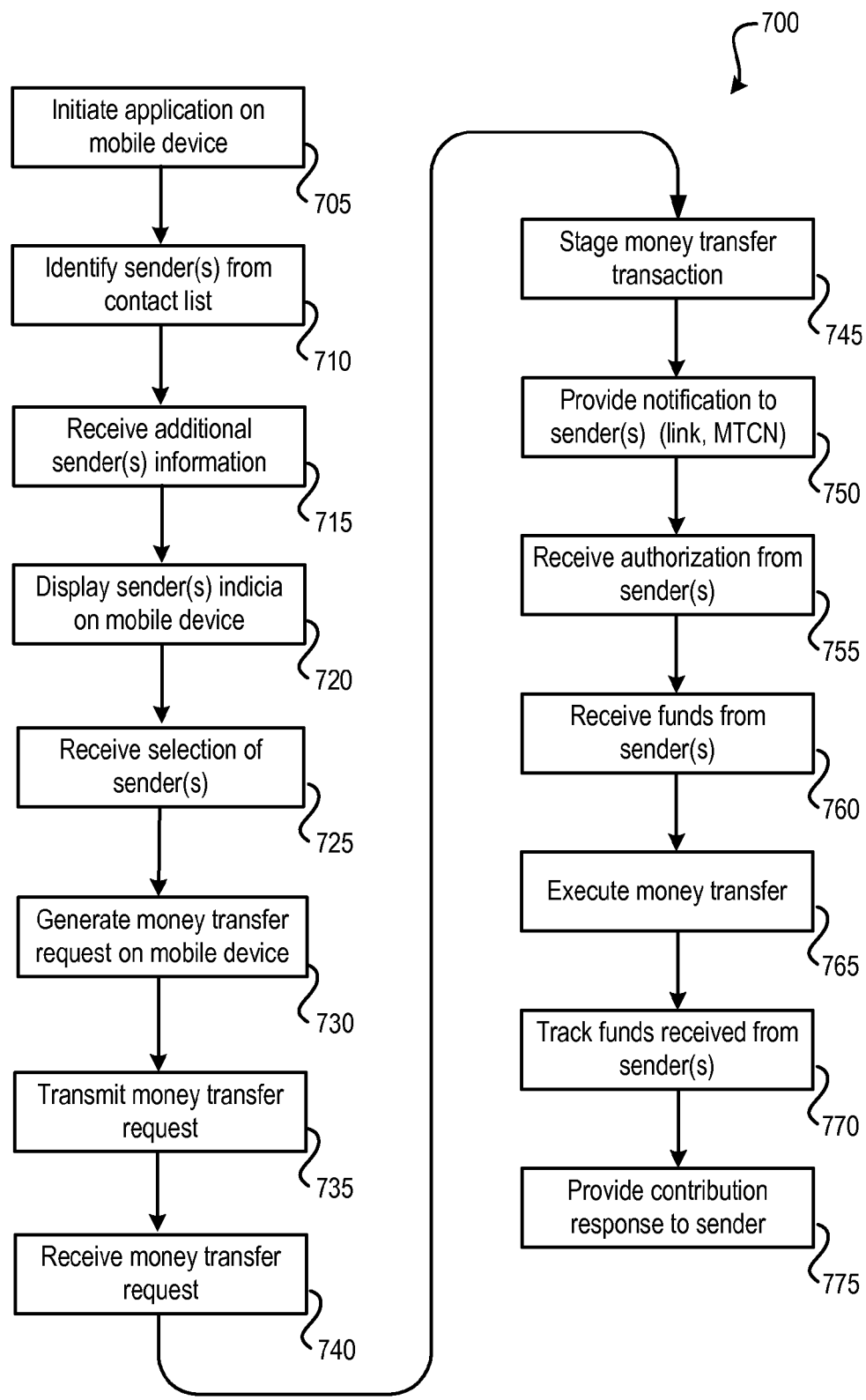
FIG. 7 illustrates a process for performing a receiver initiated money transfer according to embodiments of the present invention wherein the money transfer is initiated using a mobile device.

FIG. 7 illustrates a process 700 for performing a receiver initiated money transfer where the money transfer is initiated using a mobile device. At block 705, a transfer application may be initiated on the mobile device. The transfer application may be provided to the mobile device from the money transfer host system, such as by providing a download application to a cell phone. At block 710, the transfer application may communicate with the mobile device's contact list to identify a sender or potential sender of the funds from the contact list and obtain sender information associated with the sender or potential sender from the contact list. The transfer application can create a profile on the mobile device for each entity (individual or business) identified in the contact list.

The profile may be a request button or other indicia that is displayed on the mobile device that the receiver can select to initiate a money transfer request (block 720). In addition to obtaining information from the contact list, the transfer application can allow the receiver to manually enter sender information into the mobile device and/or obtain sender information from another source (e.g., SMS message, etc.) and create a profile for such senders (block 715). Alternatively, in some embodiments, the transfer application may not create profiles for the entities in the contact list, but may access the contact list to obtain information about one or more of the entities when a money transfer request is initiated.

The transfer application enables the receiver to make money transfer initiation requests on the fly, or in other words to make money transfer initiation requests merely by selecting the a request button or other indicia associated with one or more of the entities. At block 725, the transfer application may receive a selection of one or more senders from the receiver, such as by the receiver selecting one or more request buttons or otherwise inputting sender information into the transfer application.

At blocks 730, the transfer application may generate the money transfer request. For example, upon receiving a selection of one or more senders, the transfer application can acquire all necessary information about the one or more senders and about the receiver and compile and/or format this information so that the information may be transmitted to the money transfer host system and the money transfer transaction automatically staged. The information may be obtained from the mobile device's contact list (e.g., the sender's name, address, phone number, account number, email address, etc. may be extracted from the contact list) and/or the information may be requested from the receiver (e.g., request input from the receiver). At blocks 735 and 740, the money transfer request generated by the transfer application is transmitted to and received by the money transfer host system. The money transfer request may include an amount of funds to transfer to the receiver, receiver information, and/or sender information. The receiver information may identify the receiver and/or identify an account to which the funds will be transferred. The sender information may identify the sender, identify a communication address associated with the sender, and/or identify an account associated with the sender that the receiver desires to receive funds from. The money transfer request may be transmitted as an SMS message, MMS message, or as any other type of electronic communication and may be in the form of an invoice. The request may also include a funds designation that directs how the funds will be allocated upon receipt as previously described.

At block 745, a money transfer transaction may be staged by the money transfer host system after the money transfer request is received. The staged money transfer transaction may be fully ready for execution (i.e. pre-cleared, etc.) pending an authorization from the sender to fund the money transfer transaction. At block 750, the money transfer host system may provide a notification to the sender via the communication address. The notification may indicate the amount of funds to be transferred, a portion of the receiver information (e.g., full or partial name, online name, etc.), and/or the account selected by the receiver to receiver funds from. At block 755, the money transfer host system may receive the authorization indicating the sender's willingness to fund the money transfer transaction. At block 760, the money transfer host system may optionally receive one or more funds from one or more senders to fund the money transfer transaction.

At block 765, the money transfer host system may execute the money transfer to transfer the funds from the sender to the receiver. At block 770, the money transfer host system may track the one or more funds received from the one or more providers and provide this information to the one or more senders and/or to the receiver so that the parties are aware of the amount of funds received in relation to the total amount of funds requested. At block 775, the money transfer host system may automatically generate and provide a contribution response to the one or more senders, such as a thank you message. The contribution response may be provided anytime after the authorization is received or, in some embodiments, may be provided even when the money transfer request is denied.

Figure 8:
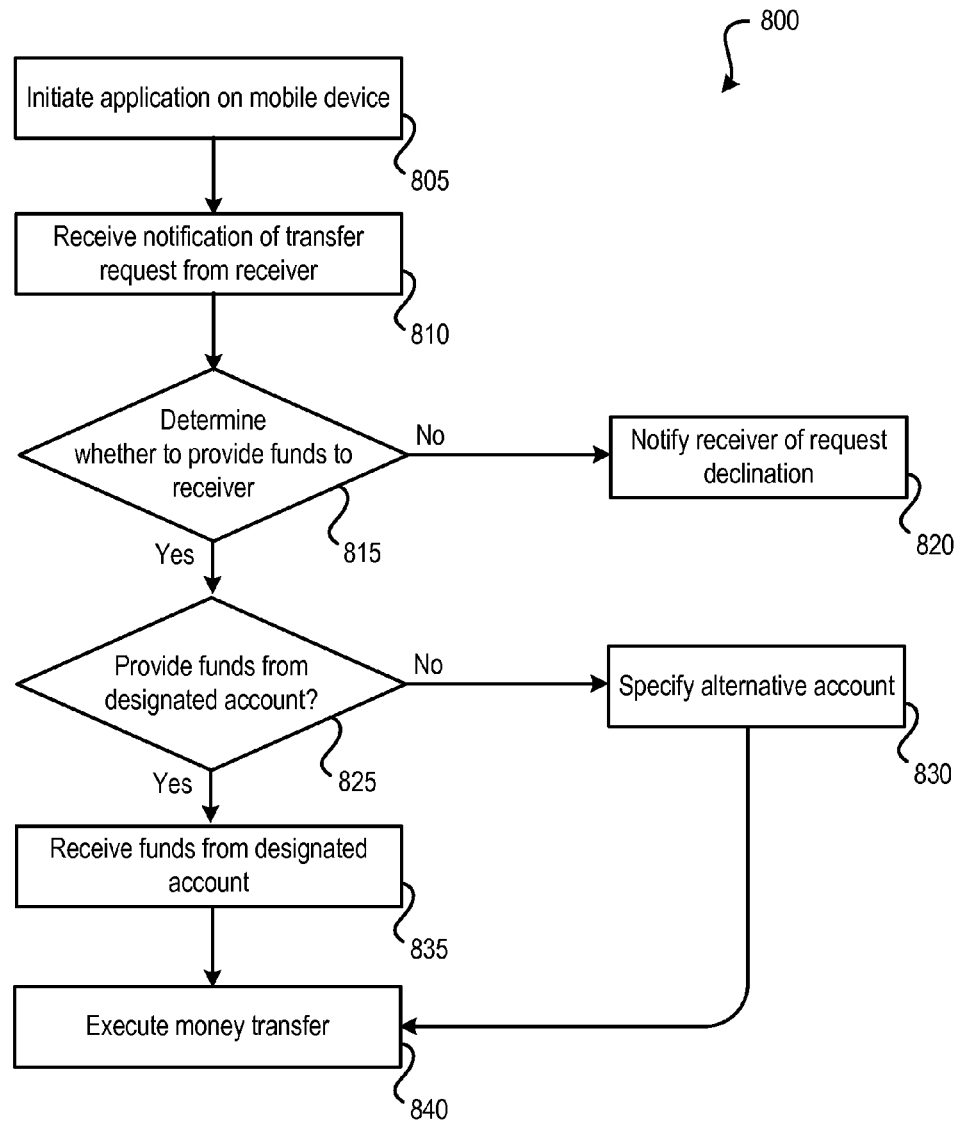
FIG. 8 illustrates a process for performing a receiver initiated money transfer according to embodiments of the present invention wherein the money transfer is authorized using a mobile device.

FIG. 8 illustrates a process 800 for performing a receiver initiated money transfer where the money transfer is authorized using a mobile device. The process 800 may include initiating a transfer application on a mobile device associated with the sender. The initiation may occur in a similar fashion as that described in relation to FIG. 7. At block 810, the notification from the money transfer host system may be received by the sender's mobile device and/or by the transfer application on the sender's mobile device. At block 815, the sender may determine whether to accept the money transfer request and provide an authorization to fund the money transfer transaction. The authorization response (or declination) may be provided to the money transfer host system from the transfer application on the sender's mobile device, for example by clicking on a accept or decline button. If the sender determines to decline the request, a notification can be sent to the receiver (e.g., via the money transfer host system or via a mobile device network provider) regarding the request declination (block 820). In some embodiments, the sender may use the transfer application to permanently block the receiver from making future money transfer requests to the sender.

If the sender determines to accept the money transfer request, at block 825, the sender can determine whether to provide the funds from an account designated by the receiver in the money transfer request (assuming the receiver designated an account). If the receiver did not designate an account or the sender determines not to provide funds from that account, the sender can specify an account to use in funding the money transfer transaction (block 830). Upon specifying an account to use in funding the transaction, the process 800 proceeds to block 840 where the money transfer is executed and the funds are transferred to the receiver.

In block 825, if the sender determines to provide the funds from the account designated by the receiver, the funds are received from the designated account (block 835) and the money transfer is executed by the money transfer host system (block 840) to transfer the funds to the receiver.

Figure 9:
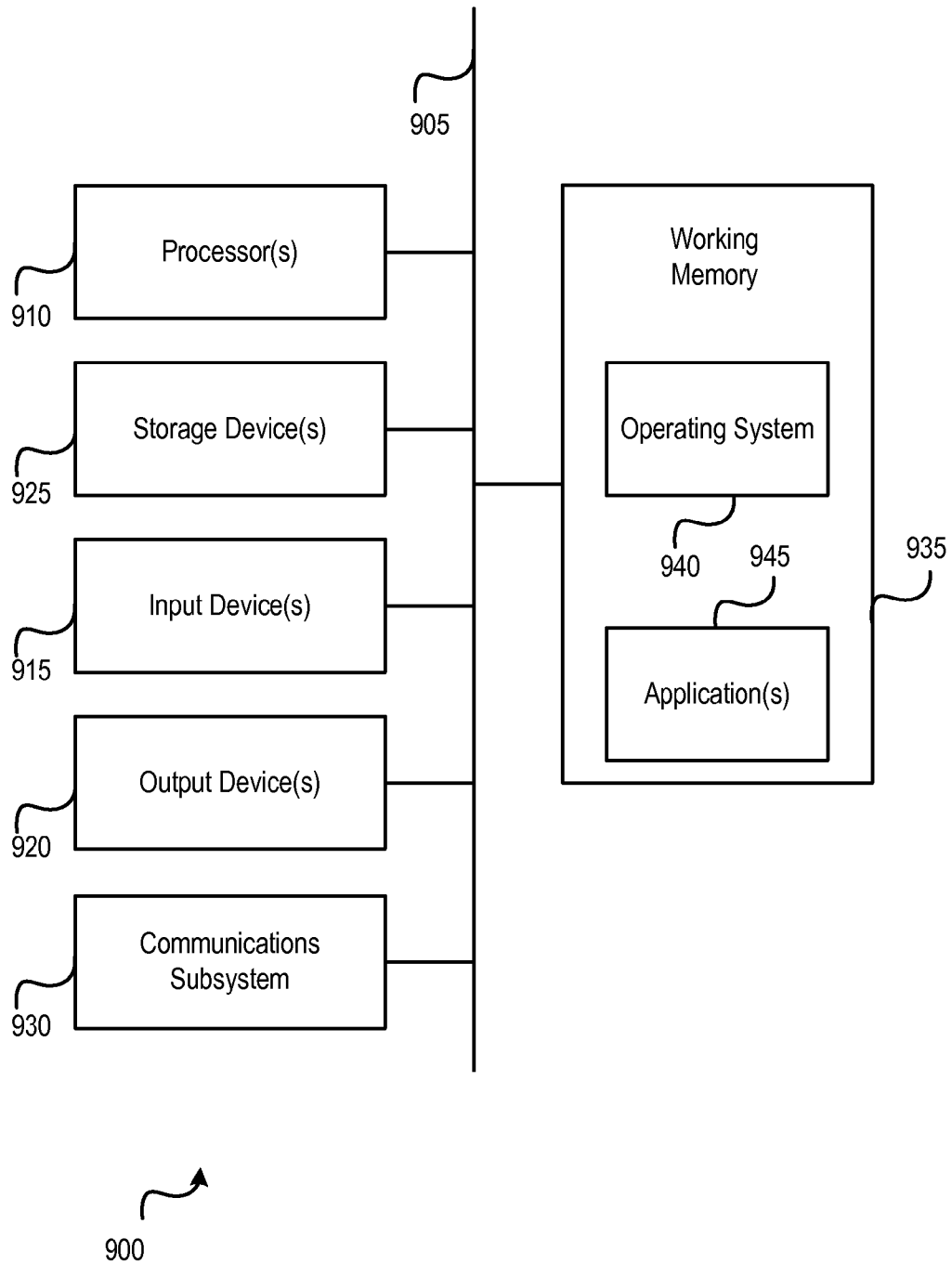
FIG. 9 is a block diagram illustrating a computer system that is capable of performing the methods and operations of systems according to the embodiments of the invention.

To perform the actions of the money transfer host system and/or any of the other previously mentioned computing devices, a computer system as illustrated in FIG. 9 may be used. FIG. 9 is a block diagram illustrating a computer system 900 that is capable of performing the methods and operations of systems according to the embodiments as described herein, and/or can function as the money transfer host system, a remote kiosk/terminal, a point-of-sale device, a mobile device, and/or a computer system. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communication subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those skilled in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for performing a money transfer initiated by a receiver of the money transfer, the method comprising:
   receiving a money transfer initiation request from the receiver, the money transfer initiation request comprising:
      receiver information that identifies the receiver;
      first sender information that identifies a first sender and identifies a first communication address associated with the first sender;
      second sender information that identifies a second sender and identifies a second communication address associated with the second sender; and
      an amount of funds to be transferred to the receiver from either or both the first sender and the second sender;
   receiving, from the receiver, a selection of an objective for the money transfer from among a plurality of objectives;
   staging a money transfer transaction after receiving the money transfer initiation request, the money transfer transaction pending authorization by the first sender and the second sender to fund the money transfer;
   generating a transaction identifier for the money transfer transaction;
   providing the first sender with a notification of the money transfer transaction via the first communication address, the notification identifying:
      a first portion of the amount of funds to be received from the first sender, and
      an identification of the receiver,
   providing the second sender with a notification of the money transfer transaction via the second communication address, the notification identifying:
      a second portion of the amount of funds to be received from the second sender, and
      the identification of the receiver,
   receiving authorization from the first sender to fund the first portion of the amount of funds of the money transfer transaction;
   receiving authorization from the second sender to fund the second portion of the amount of funds of the money transfer transaction;
   receiving the first portion of the amount of funds from the first sender;
   receiving the second portion of the amount of funds from the second sender; and
   executing the money transfer to transfer the first portion of the amount of funds from the first sender to the receiver and to transfer the second portion of the amount of funds from the second sender to the receiver for payment of the objective.

2. The method for performing a money transfer according to claim 1, the method further comprising:
   receiving a funds designation from the receiver, wherein the fund designation provides instructions for allocating the funds of the money transfer;
   receiving the funds from either or both the first sender and the second sender; and
   automatically allocating the funds in accordance with the funds designation.

3. The method for performing a money transfer according to claim 2, wherein the funds designation comprises indicia on a wireless device, the indicia associating a payment with a selected sender from among a plurality of senders such that:
   upon selection of the indicia, the money transfer initiation request is generated on the wireless device and provided to the money transfer host system, and
   the funds are automatically applied to pay toward the payment.

4. The method for performing a money transfer according to claim 2, wherein the funds designation is stored on a magnetic stripe of a presentation instrument, and wherein the method further comprises:
   generating the money transfer initiation request for a pre-designated sender upon use of the presentation instrument by the receiver for one or more payments;
   providing the money transfer initiation request to the money transfer host system; and
   applying the funds to pay the one or more payments.

5. The method for performing a money transfer according to claim 1, wherein the transaction identifier comprises:
   a hyperlink in an email.

6. The method for performing a money transfer according to claim 1, wherein the money transfer initiation request further comprises an instruction for either or both the first sender and the second sender to either provide the entire amount of funds or provide a specified portion of the amount of funds.

7. The method for performing a money transfer according to claim 1, wherein receiving the authorization from either or both the first sender and the second sender comprises receiving account information for an account from which the funds will be provided for the money transfer.

8. The method for performing a money transfer according to claim 7, wherein the account information is selected from the group consisting of:
a bank account,
a M-wallet account,
cash provided to an agent of the money transfer host system,
a credit card account,
a prepaid account,
a prepaid card,
an ACH transaction,
a E-wallet, and
a loyalty point account.

9. The method for performing a money transfer according to claim 1, further comprising:
applying the funds towards the amount of funds; and
notifying the first sender and the second sender of the applied funds in relation to the amount of funds requested.

10. The method for performing a money transfer according to claim 1, wherein staging the money transfer transaction further comprises:
ensuring that the money transfer complies with at least one money transfer regulation prior to receiving the authorization from the sender.

11. The method for performing a money transfer according to claim 1, wherein:
either or both the first sender and the second sender and the receiver are enrolled in a money transfer initiation service that provides one or more services selected from the group consisting of:
automatic money transfer initiation request generation and staging;
reminder notifications for either or both the first sender and the second sender to fund the money transfer transaction;
notification to either or both the first sender and the second sender that the receiver is requesting funds; and
pre-approved funding of the money transfer transaction.

12. The method for performing a money transfer according to claim 1, wherein:
the receiver is a merchant and either or both the first sender and the second sender are a customer of the merchant;
the money transfer initiation request comprises a payment notice from the merchant for a good or for a service; and
the method further comprises:
receiving the payment notice;
extracting either or both the first sender and the second sender information from the payment notice;
staging the money transfer transaction after receiving the payment notice;
providing the payment notice to the customer;
receiving authorization from the customer to provide funds to pay for the good or service; and
executing the money transfer to transfer funds from the customer to the merchant to pay for the good or service.

13. The method for performing a money transfer according to claim 1, further comprising:
storing the receiver information and either or both the first sender and the second sender information on a magnetic stripe of a presentation instrument, wherein the money transfer initiation request is provided to the money transfer host system upon the receiver presenting the presentation instrument to a magnetic stripe reading device.

14. The method for performing a money transfer according to claim 1, wherein the communication address comprises one or more of the following:
an email address;
a physical address associated with the sender;
an IP address;
a telephone number; and
a number of a wireless device.

15. A system for performing a money transfer initiated by a receiver, the system comprising:
a memory component configured to store instructions; and
a processor communicatively coupled with the memory component, the processor configured to receive the instructions from the memory component, wherein the instructions direct the processor to enable the system to:
receive a money transfer initiation request from the receiver, the money transfer initiation request comprising:
receiver information that identifies the receivers;
first sender information that identifies a first sender and identifies a first communication address associated with the first sender; anti
second sender information that identifies a second sender and identifies a second communication address associated with the second sender; and
an amount of funds to be transferred to the receiver from either or both the first sender and the second sender;
receive, from the receiver, a selection of an objective for the money transfer from among a plurality of objectives;
stage a money transfer transaction after receiving the money transfer initiation request, the money transfer transaction pending authorization by the first sender and the second sender to fund the money transfer;
generate a transaction identifier for the money transfer transaction;
provide the first sender with a notification of the money transfer transaction via the first communication address, the notification identifying:
a first portion of the amount of funds to be received from the first sender, and
an identification of the receiver,
provide the second sender with a notification of the money transfer transaction via the second communication address, the notification identifying:
a second portion of the amount of funds to be received from the second sender, and
the identification of the receiver,
receive authorization from the first sender to fund the first portion of the amount of funds of the money transfer transaction;
receive authorization from the second sender to fund the second portion of the amount of funds of the money transfer transaction;
receive the first portion of the amount of funds from the first sender;
receive the second portion of the amount of funds from the second sender; and
execute the money transfer to transfer the first portion of the amount of funds from the first sender to the receiver and to transfer the second portion of the amount of funds from the second sender to the receiver for payment of the objective.

\* \* \* \* \*